United States Patent
Gothe

[11] 3,809,212
[45] May 7, 1974

[54] CONTROL FOR RECIPROCATING GRATE CONVEYOR

[75] Inventor: Walter C. Gothe, Macungie, Pa.

[73] Assignee: Fuller Company, Catasauqua, Pa.

[22] Filed: July 31, 1972

[21] Appl. No.: 276,491

[52] U.S. Cl. ............................. 198/232, 198/219
[51] Int. Cl. ............................................. B65g 43/00
[58] Field of Search ............. 198/232, 219; 73/151; 340/285, 267 R

[56] References Cited
UNITED STATES PATENTS
| | | | |
|---|---|---|---|
| 1,187,744 | 6/1916 | Weller | 198/219 |
| 2,691,300 | 10/1954 | Morris | 73/151 X |
| 3,597,661 | 8/1971 | Isaacs | 340/267 R |

*Primary Examiner*—Evon C. Blunk
*Assistant Examiner*—Douglas D. Watts
*Attorney, Agent, or Firm*—Frank H. Thomson

[57] ABSTRACT

A control for a reciprocating grate conveyor wherein the conveyor includes support structure which supports alternate rows of fixed and movable grates with a motor and transmission arrangement for reciprocating the movable grates to advance material along the conveyor. The control system includes a strain gage network mounted on the crank shaft of the movable grate drive mechanism. The strain gages generate a signal proportional to the forces on the means for reciprocating the movable grates. An arrangement is provided whereby when the force exceeds a first predetermined maximum, an alarm is sounded. If the forces on the drive mechanism exceed a second, higher predetermined maximum, the conveyor drive motor is stopped.

1 Claim, 4 Drawing Figures

COMPRESSION

TENSION

CONTROL FOR RECIPROCATING GRATE CONVEYOR

BACKGROUND OF THE INVENTION

This invention relates to apparatus for signaling the onset of excessive strain in a member subjected to cyclical forces and in particular to such an apparatus applied to the drive mechanism of a reciprocating grate conveyor.

If the drive mechanism of reciprocating grate conveyors is subjected to excessive forces, severe damage can be inflicted on the drive mechanism and on the conveyor itself. This can result in the requirement that the conveyor be shut down and reconstructed.

Excessive forces on the drive mechanism can be a result of misalignment of the conveyor or component parts thereof. In conveyors used in coolers for hot material, this misalignment can be a result of the high temperatures encountered by the conveyor and the temperature differential across the conveyor. The excessive forces could also be due to large pieces of the material being conveyed or pieces of broken grates becoming lodged in the reciprocating grates of the conveyor.

It often happens that due to misalignment, excessive forces will gradually build up in the conveyor reciprocating mechanism. These excessive forces can result in one of the grate plates breaking thereby producing a sudden build up in the excessive forces. This sudden build up can result before the force build up could be corrected through routine maintenance and result in severe damage to the conveyor and drive mechanism.

Prior to the present invention, no successful means has been provided which will result in a warning that excessive forces are building up in the conveyor or conveyor drive mechanism or, if excessive forces become too great, will shut down the conveyor. Attempts have been made to use shear pins, torque limiting clutches and the like to disconnect the drive mechanism in the event of excessive forces. However, these arrangements have not proved satisfactory particularly where the conveyor is not maintained in the optimum manner.

SUMMARY

It is the principal object of this invention to provide an apparatus which continuously monitors strain on a member subjected to cyclical forces and signals the onset of forces exceeding a predetermined set maximum.

It is another object of this invention to provide a reciprocating grate conveyor including apparatus for indicating excessive forces on the reciprocating mechanism.

It is another object of this invention to provide a reciprocating grate conveyor which includes apparatus for stopping the conveyor when the forces on the reciprocating mechanism exceed a predetermined maximum.

In general, the foregoing and other objects will be carried out by providing in combination, a reciprocating grate conveyor comprising a plurality of grate means including fixed grates alternating with movable grates, and means for reciprocating said movable grates relative to said fixed grates; and apparatus responsive forces on said means for reciprocating said movable grates for generating a signal indicative of the forces on said means for reciprocating said movable grates, and means responsive to said signal for indicating when the forces on said means for reciprocaing said movable grates exceed a predetermined maximum.

BRIEF DESCRIPTION OF THE DRAWINGS

The invention will be described in connection with the annexed drawings wherein.

DESCRIPTION OF THE PREFERRED EMBODIMENT

Figure 1:
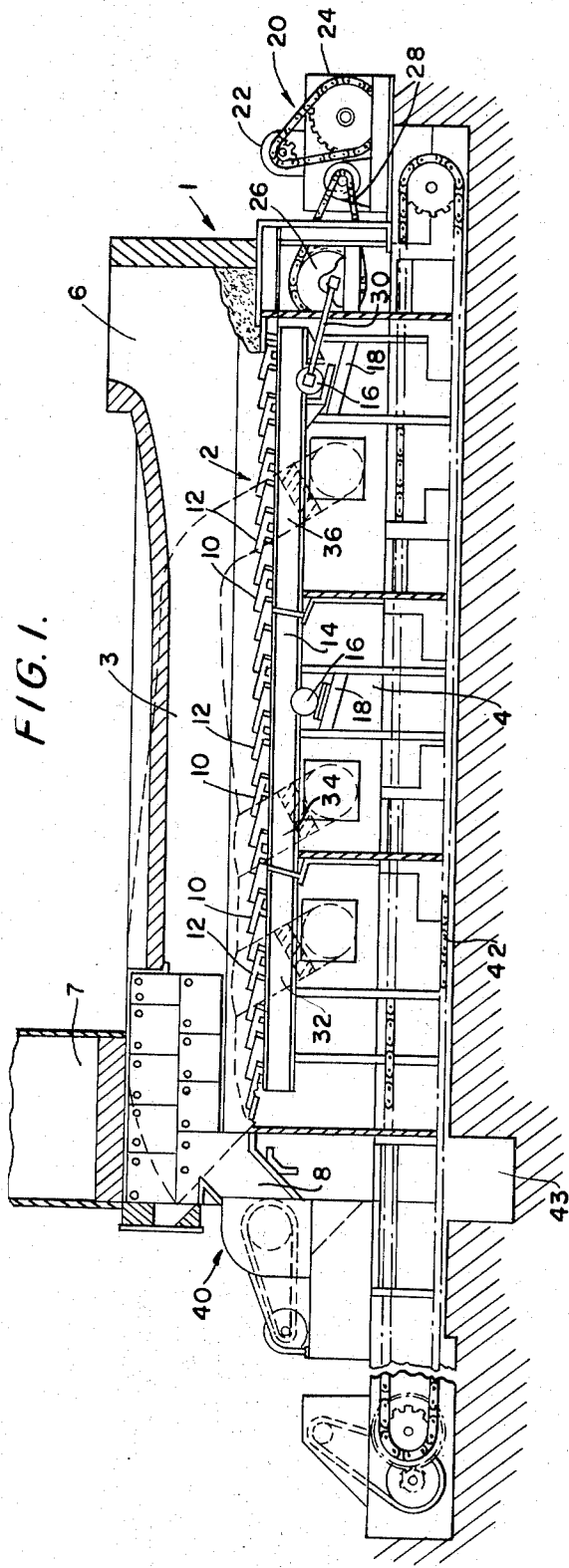
FIG. 1 is a sectional view of a hot material cooling apparatus employing a reciprocating grate conveyor.

Referring to FIG. 1, there is shown a cooler 1 for hot material such as cement clinker discharged from a rotary kiln. The cooler 1 includes a reciprocating grate conveyor generally indicated at 2 dividing the cooler 1 into an upper material chamber 3 and a lower plenum chamber 4 and adapted to support a bed of particulate material such as cement clinker in the material chamber 3. The chamber 3 includes a hot material inlet 6 and a cool material outlet 8.

The conveyor 2 includes alternate rows of fixed grates 10 and movable grates 12 with the movable grates connected to a pair of beams 14 as it is well known in the art. The beams 14 are secured to wheel-axle assemblies 16 which ride on incline members 18. The conveyor is provided with a drive mechanism generally indicated at 20 which includes motor means 22 and a transmission 24. A drive sprocket 26 is operatively connected to the transmission 24 by any suitable means such as a chain 28. A crank arm 30 is eccentrically connected at one end to the sprocket 26 and at its other end to one of the wheel and axle assemblies 16. When the motor 22 is operated, the sprocket 26 is rotated about its own axis and reciprocates the crank arm 30. The reciprocating of the crank arm 30 produces a reciprocating motion in the beams 14 and movable grates 12 connected thereto. In a manner well known in the art, as the movable grates 12 reciprocate relative to the fixed grates 10, material is advanced along the conveyor from the material inlet 6 to the material outlet 8.

Each of the fixed grates 10 and movable grates 12 is provided with a plurality of openings therein to provide communication between the lower plenum 4 and the upper material chamber 3. Fans (not shown) are provided for blowing gaseous fluid such as air through ducts 32, 34 and 36 into the plenum chamber 4. This air passes through the openings in the grates 10 and 12 and through the bed of material formed on the conveyor 2. This air is used for cooling the hot material in the chamber 3. As the cool air passes through the hot material, it is heated and at least a portion may be returned to the furnace through material inlet 6 to serve as combustion air. The remaining heated air may be vented through stack 7.

The conveyor may also include a material breaker 40 at the outlet 8 for reducing the size of the material.

Since the grate plates 10 and 12 are provided with a plurality of holes therein to permit cooling air to pass therethrough, some of the material may fall through the conveyor 2 into the plenum 4. A drag chain conveyor 42 is provided for conveying such particles to a discharge trough 43. Although only a single drive mechanism and crank arm 30 have been illustrated in FIG. 1, it should be understood that most conveyors employ a pair of drive motors 22 and crank arms 30.

During operation of the conveyor, as the sprocket 26 rotates and the crank arm 30 moves forward, the beams 14 move forward and upward on the inclined tracks 18. This forward and upward movement causes the movable grates 12 to push into the bed of material on the conveyor. The beams 14 and grates 12 must be moved upward by the crank arm 30 and their own weight plus the push into the bed of material results in high compressive forces on the crank arm 30. As the sprocket 26 continues to rotate, the beams 14 and grates 12 move rearwardly and downwardly away from the bed of material. The weight of the beams 14 and grates 12 greatly reduces the power requirements needed to return the movable grates although there is still a compressive force on the crank arm 30. As measured in a reciprocating grate conveyor used in a hot material cooler, such as that of FIG. 1, the cyclical forces on the crank arm 30 and the entire reciprocating mechanism are illustrated in FIG. 4.

Figure 4:
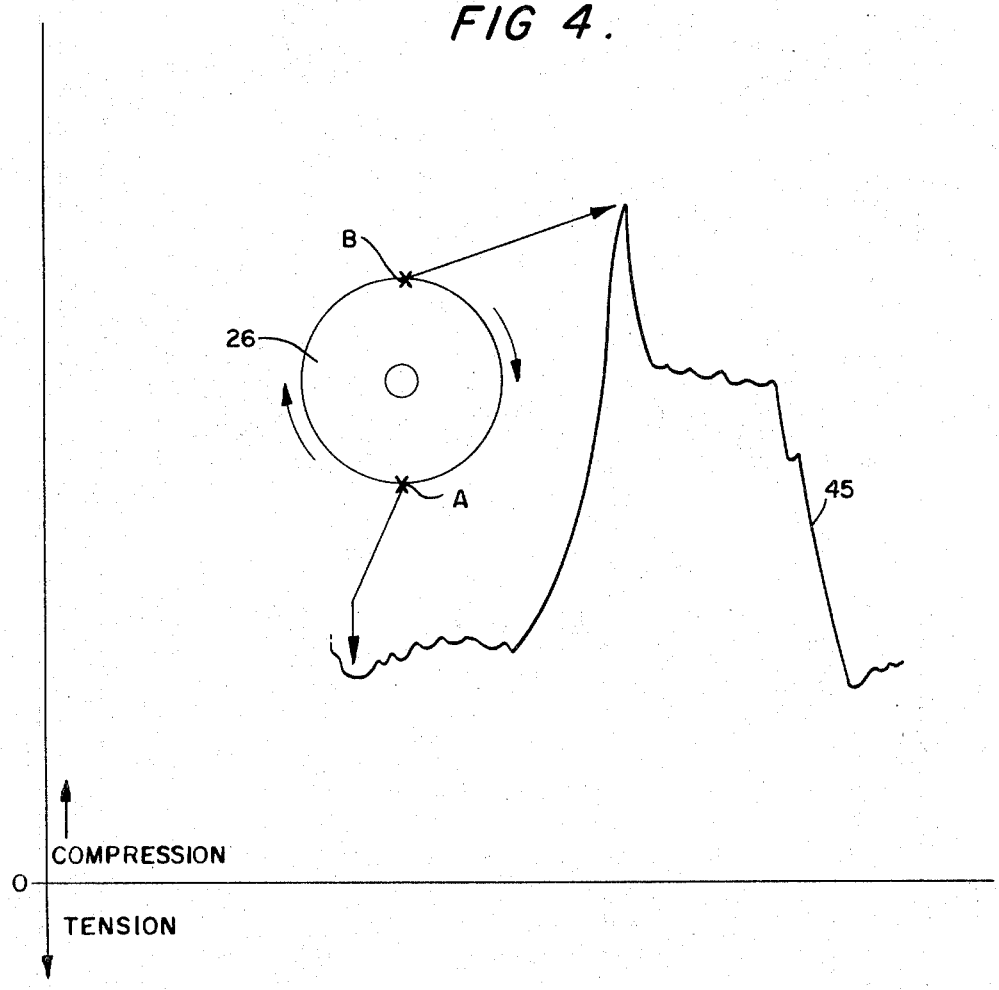
FIG. 4 is a graph illustrating the cyclical forces to which the drive mechanism is subjected.

Referring now to FIG. 4, point A is considered to be the rearwardmost position of the crank arm 30. At this point, the least amount of compressive forces are applied to the reciprocating mechanism and the arm 30.

As the sprocket 26 rotates in a clockwise direction, the crank arm 30 moves forward to advance the beam 14 and grates 12. This forward movement increases the compressive forces on the crank arm 30 until they reach their maximum at point B which is the forwardmost position of the crank arm 30, beam 14 and movable grates 12. The continued roation of the sprocket 26 results in the rearward motion of the arm 30, beam 14 and movable grates 12. This rearward motion results in a decrease in the compressive forces applied to the arm 30. The cyclical forces are illustrated by the line 45 of FIG. 4.

In the event the forces on the reciprocating mechanism of the conveyor exceed a certain amount, the conveyor can be damaged to such an extent that its replacement or complete reconstruction may be necessary. Therefore, it would be desirable to continuously monitor the forces to which the reciprocating mechanism is subjected in order to determine whether something is wrong with the conveyor and in the event the forces exceed a certain set maximum, to sound an alarm and/or shut down the conveyor. By the present invention, I have provided such a continuous monitor system and control apparatus.

Figure 2:
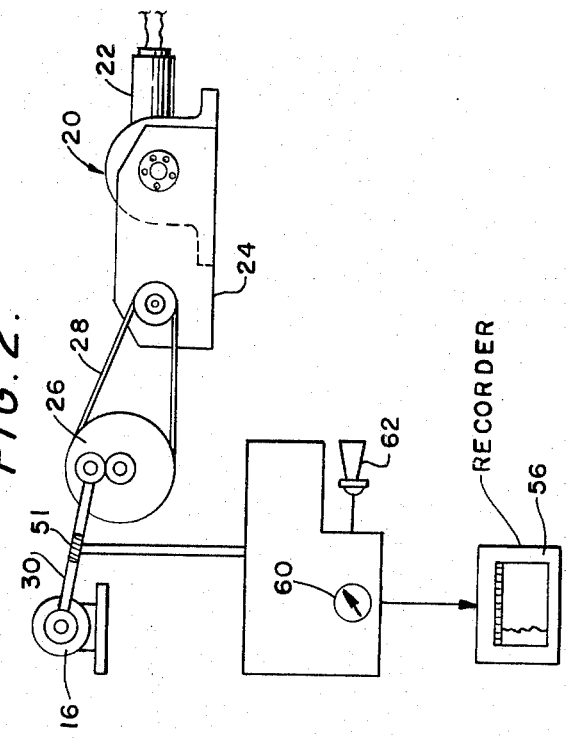
FIG. 2 is a diagrammatic view of a portion of the drive mechanism of the conveyor and the force signaling apparatus.
Figure 3:
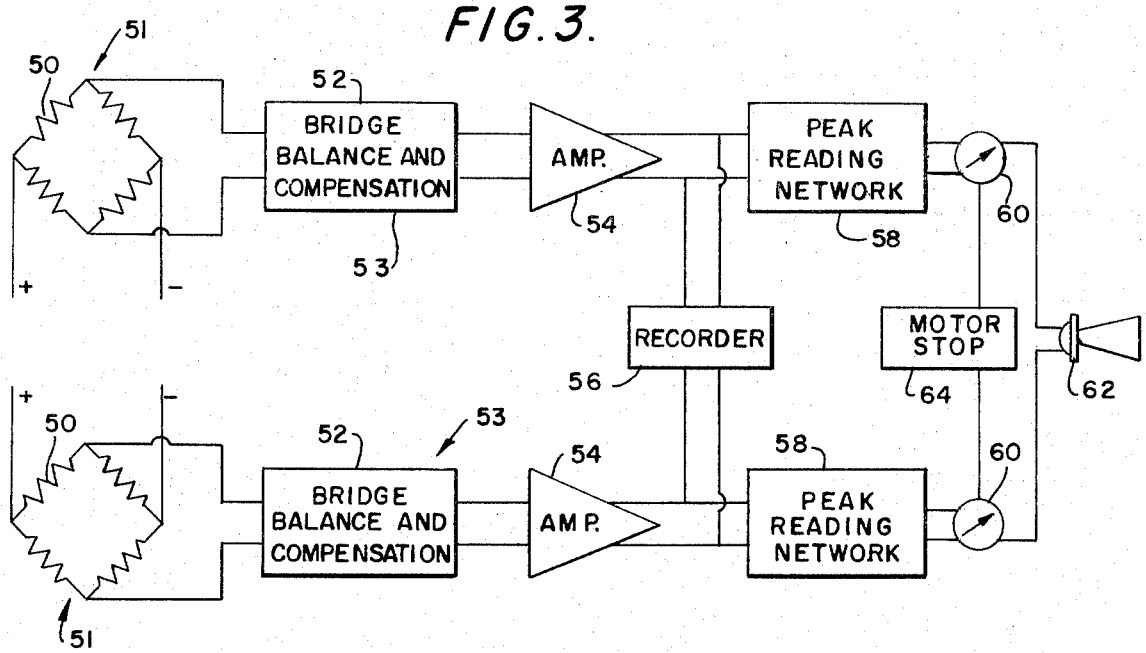
FIG. 3 is a schematic diagram of the circuitry of the present invention.

Referring to FIGS. 2 and 3, strain gages 50 are mounted on the crank arm 30 in a bridge circuit 51 as is conventional for strain gages. In FIG. 3, there is illustrated two identical circuits 53 in view of the fact that most conveyors would have two crank arms 30. Both circuits may be connected to a single power source. A bridge balance and compensation circuit 52 is connected to the bridge 51. This system is used to balance the bridge 51 in a conventional manner and compensate for the fact that the crank arm 30 is subjected to continuous compression and never reaches an actual zero point. An amplifier 54 is connected to the bridge balance and compensation circuit 52. This amplifier is necessary in view of the fact that the bridge circuit generates a weak signal and the control system will be located at some distance from the cooler or conveyor itself. If desired, a recorder 56 may be provided to provide a continuous monitoring of the forces to which the crank arm 30 and the entire reciprocating mechanism are subjected.

A peak reading network 58 is connected to the amplifier 54. This network is required because of the cyclical nature of the forces and the short duration of the peak force. An alarm meter 60 is connected to the peak reading network and is preferably adjustable. This meter will continuously monitor the output of the peak reading network 58 and includes an arrangement whereby when the output exceeds a first predetermined maximum, it connects in a circuit an alarm 62, such as a horn. The peak reading network serves to insure that the horn will let out more than a very short blast. The alarm meter 60 is also connected to a motor stop control 64 with the meter 60 having a second, higher set point at which the motor stop 64 is connected to the peak reading network 58. When the forces exceed the second set point, the drive motor 22 of the reciprocating mechanism 20 will shut down.

The second set limit for the motor stop arrangement is important in that once the first set point is reached, it is possible that the second set point, i.e., a point just before extreme damage would be done to the conveyor, will be reached in a very short time after the first set point is reached. In most circumstances, it is believed that some time will occur between the first set point and the second set point. This time will enable maintenance personnel to determine the cause of the excessive forces on the conveyor and correct them. However, in the event a grate plate fails and becomes lodged in the conveyor, the second set point may be reached very rapidly. The motor stop control prevents severe damage to the conveyor and reciprocating mechanism.

The circuits 53 are designed so that in the event either senses excessive forces being applied to the crank arm 30 to which it is connected, the alarm and/or the motor stop will be actuated.

It should be apparent from the foregoing that the objects of the invention have been carried out. A continuous monitoring system has been provided for a reciprocating grate conveyor which monitoring system will sound an alarm in the event the reciprocating mechanism is subjected to excessive forces. In the event the forces become too high, the reciprocating conveyor will be automatically shut down. The apparatus of the present invention provides a continuous monitor of cyclical forces applied to any reciprocating mechanism.

Although the invention has been described as it would be used in connection with a reciprocating grate conveyor of a clinker cooler, it is intended that the invention could be applied to reciprocating grate conveyors for other purposes or with any reciprocating motion mechanism, or with other apparatus which is subjected to cyclical forces.

It is intended that the foregoing description be merely that of a preferred embodiment and that the invention be limited solely by that which is within the scope of the appended claims.

I claim:

1. In combination, a reciprocating grate conveyor for supporting and advancing a bed of solid particulate material comprising a plurality of grate means including fixed grates alternating with movable grates, and means for reciprocating said movable grates relative to said fixed grates whereby the movable grates alternately move into and out of the bed of material to advance the material, and said means for reciprocating the movable grates is substantially continuously subjected to cyclical compressive forces; and apparatus responsive to the forces on said means for reciprocating said movable grates for generating a signal indicative of the forces on said means for reciprocating said movable grates, and means responsive to said signal for indicating when the forces on said means for reciprocating said movable grates exceed a predetermined maximum including an alarm and means for actuating said alarm when the force on said means for reciprocating the movable grates exceeds a first predetermined maximum and means for stopping said means for reciprocating the movable grates when the force on the means for reciprocating the movable grates exceeds a second predetermined maximum;

said means for reciprocating said movable grates includes a crank arm operatively connected to said movable grates and motor means operatively connected to said crank arm, and said apparatus responsive to the forces on said means for reciprocating said movable grates includes strain gages mounted on said crank arm;

said apparatus responsive to the forces on said means for reciprocating the movable grates further comprising amplifier means for receiving and amplifying the signal generated by said strain gages, and a peak reading network interposed between said amplifier and said means responsive to said signal for indicating when the force on said crank arm exceeds a predetermined maximum.

* * * * *